United States Patent

Serratto

[11] 3,754,595
[45] Aug. 28, 1973

[54] DEVICE FOR THE AUTOMATIC PROPORTIONAL CONTROL OF PHYSICAL QUANTITIES IN A HYDRAULIC CIRCUIT

[76] Inventor: Angelo Serratto, Piazza Novelli 10, Milan, Italy

[22] Filed: Mar. 17, 1971

[21] Appl. No.: 125,241

[30] Foreign Application Priority Data

Mar. 23, 1970 Italy..........................22290A/70

[52] U.S. Cl....................... 165/36, 236/80, 236/99, 251/25
[51] Int. Cl. .......................................... G05d 23/12
[58] Field of Search .................. 236/80, 42, 72, 82, 236/17, 18; 165/32, 36; 251/25; 71/363; 62/222

[56] References Cited
UNITED STATES PATENTS 2,536,184  1/1951  Johnson............................ 236/82 X
3,172,600  3/1965  Miner ............................... 236/80 X Primary Examiner—William E. Wayner
Attorney—Allison C. Collard

[57] ABSTRACT

A device for the automatic proportional control of physical quantities in a hydraulic circuit which is hydraulically operated by the same water flowing in the circuit or system to be controlled, particularly for the peripheral units of large centralized air conditioning plants. A hydraulic motor of a control unit is actuated by the difference in hydraulic pressure between the inlet and the outlet of each of the heat exchangers and this actuation is controlled in a proportional mode by a regulation member. One of a two chambers defined by a piston of the hydraulic motor is connected to a section of the heat exchanger which is in between the inlet and outlet thereof and has an intermediate value of pressure. The other chamber is connected to a port of the regulation member which is coupled alternately with the inlet or the outlet of the heat exchangers depending on the type of variation, i.e., increase or decrease with respect to the value taken as reference of a selected physical quantity, such as temperature. A cam shaft linked to a piston rod of the hydraulic motor provides a feedback effect, whereby the regulation is made proportional.

6 Claims, 6 Drawing Figures

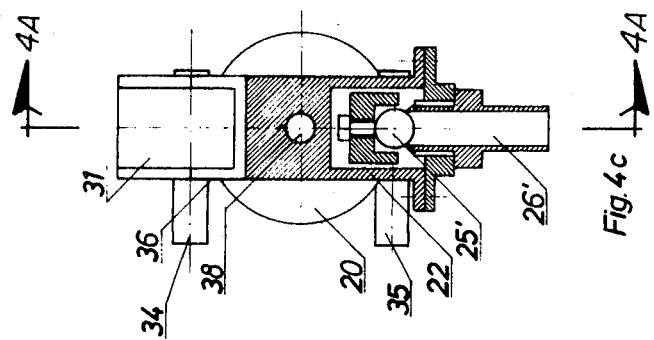
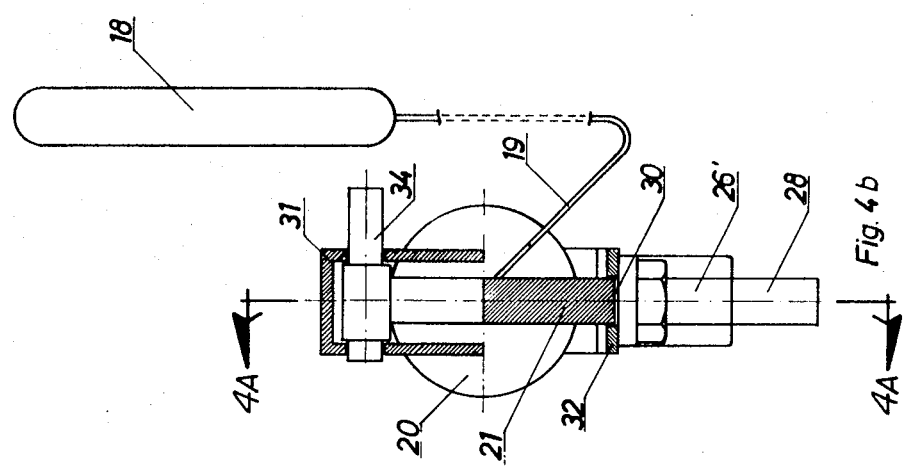

3,754,595

DEVICE FOR THE AUTOMATIC PROPORTIONAL CONTROL OF PHYSICAL QUANTITIES IN A HYDRAULIC CIRCUIT

BACKGROUND OF THE INVENTION

Th present invention relates to a device for the automatic proportional control of the temperature, pressure, humidity and generally of all the physical quantities relating to thermic processes, particularly heating and air conditioning processes.

At resent the known devices of this kind are pneumatically or electrically operated, depending on whether the motor of the control member (valve or gate) receives the driving signal from the controlling member (thermostat, pressure switch, humidostat etc.) as compressed air or as electric current. The compressed air or the electric current fed to the controlling member is fixed and constant as to the quantity, at the input thereof whereas at its output the air or current is a modulated quantity which drives the control member. Such a modulation causes the control member to assume an univocal position in relation to the controlling member. It is therefore obvious that both in case of pneumatic and of electric regulation, pipes or lines must be provided to connect the controlling members with a central source able to supply air at a constant pressure or electric current at a constant voltage, and that other pipes or lines between controlling members and control members are also required.

These auxiliary pipes or lines make the installations much more complex and expensive, and, of course, they may be the source of failures which cannot be easily located and which may cause troubles and drawbacks in the main system that is to be controlled.

SUMMARY OF THE INVENTION

The present invention provides a novel device for the automatic proportional regulation of the quantity to be controlled, which device does not require additional lines and pipes, and is thus more economical and simple in its construction, operation and maintenance. The regulation device according to the present invention is particularly suitable for large centralized air conditioning plants having a plurality of peripheral units with secondary water distribution with two, three or four pipes, employing for its own operation the water circulating in the same supply pipes of the air conditioning peripheral units. The motor of the control member is actuated by the difference in hydraulic pressure between the inlet and the outlet of each heat exchanger and its activation is controlled in a proportional mode by the regulation member of the present invention.

BRIEF DESCRIPTION OF THE DRAWINGS

Further advantages, objects and features of the regulation device according to the present invention will be apparent to those skilled in the art from the following detailed description of an embodiment thereof, given by way of non-limiting example in connection with the accomapnying drawings in which:

FIGS. 4a, 4b and 4c show three schematic sections of a device according to the present invention, wherein FIGS. 4b and 4c are two cross-sections taken along the lines 4B—4B and 4C—4C of FIG. 4a, while FIG. 4a is a section taken along the line 4A—4A of FIG. 4b and 4c.

DETAILED DESCRIPTION OF THE PREFERRED EMBODIMENT

Figure 1:
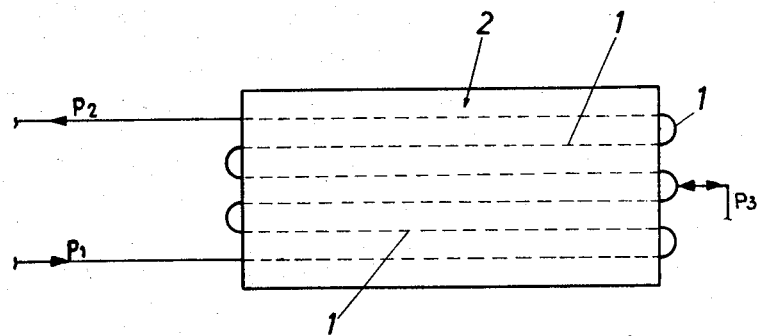
FIG. 1 shows schematically a known type of heat exchanger to be controlled, consisting in this case of a heat exchanger battery.
Figure 2:
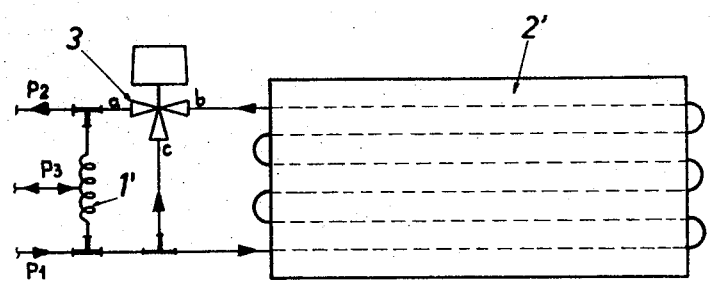
FIG. 2 shows schematically the same heat exchanger provided with a three-way valve for the circulating water.

Referring now to FIG. 1, there is schematically shown a heat exchanger 2 of a peripheral air conditioning apparatus provided with water inlet and outlet pipes, while in FIG. 2 there is schematically shown the heat exchanger 2' the inlet and outlet sections of which are connected to each other through a three-way valve 3. As stated before, the motor of the control member according to the present invention is actuated by the difference in hydraulic pressure due, in the case of FIG. 1, to the pressure drop occurring as water passes through the pipes of heat exchanger 2 or, as in the case of FIG. 2, to the pressure drop occurring as water passes through capillary 1'.

In the case of FIG. 1 the differentials $\Delta p' = p_1 - p_3$ and $\Delta p'' = p_3 - p_2$ may be used to actuate the motor of a gate or one or more valves, whereas in the case of FIG. 2 said differentials may operate directly valve 3, because the pressure drop $p_1 - p_3$ and $p_3 - p_2$ exist when the water flows through the valve both from $b$ to $a$ and from $c$ to $a$. The only necessary condition for the pressure drops to be generated is the water circulation in the system.

Figure 3:
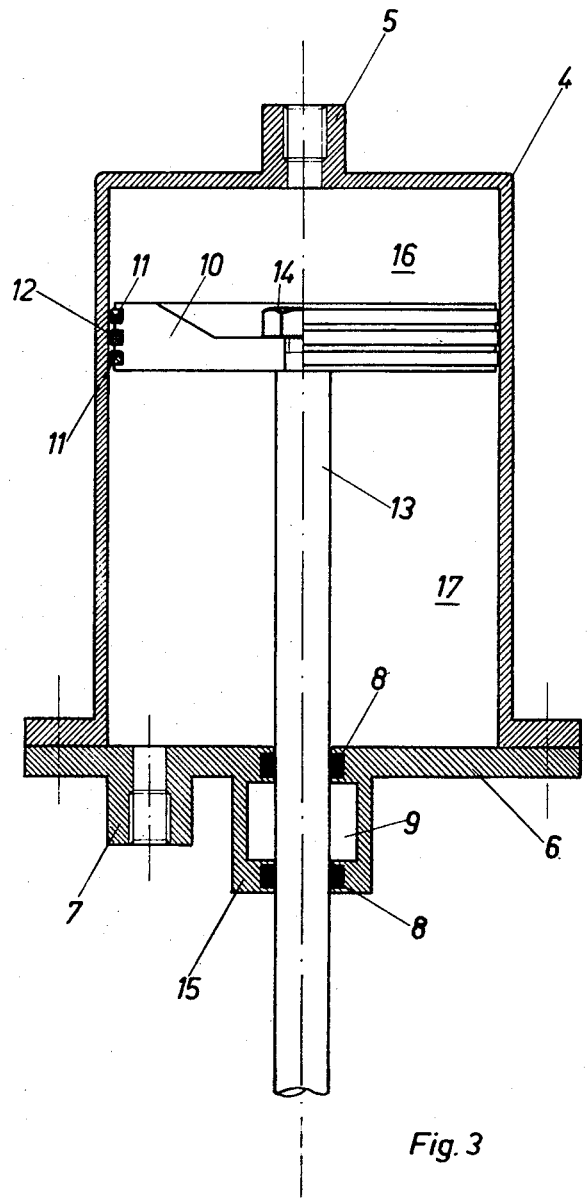
FIG. 3 shows a hydraulic motor which represents the control member of the heat exchanger of FIG. 1.

FIG. 3 represents the hydraulic motor of a control member actuated by the above-mentioned pressure differences, said motor being illustrated as a cylinder 4 provided with an upper hydraulic connection 5, a closure cover 6 with a lower hydraulic connection 7 and a shaft passageway 15 with plain bearings 8 made of an antifriction material and a hydraulic seal 9, in the interior of which is slidable a piston 10 with hydraulic seals 11 and a slide ring 12 made of an antifriction material, to which piston a shaft 13 is fixed by means of a nut 14.

One of the two chambers, for example chamber 16, is always connected with the area at pressure $p_3$: it results that when the chamber 17 is connected with the area at pressure $p_1$ ($>p_3$) the piston moves upwardly causing the withdrawal of shaft 13; the opposite occurs when chamber 17 is connected with the area at pressure $p_2$ ($<p_3$). Rod 13 suitably connected may efficiently operate a gate, one or more valves etc., but only in the case that piston 10 may reverse its stroke and be stopped in any position in order to achieve a proportional control. In a motor thus conceived, the force acting on rod 13 depends exclusively on the surface of piston 10 and on the pressure differences between the two chambers 16 and 17, In order to obtain a proportional control it is therefore necessary to interlock the rod 13 with a controlling member responsive to the quantity to be regulated.

Figure 4A:
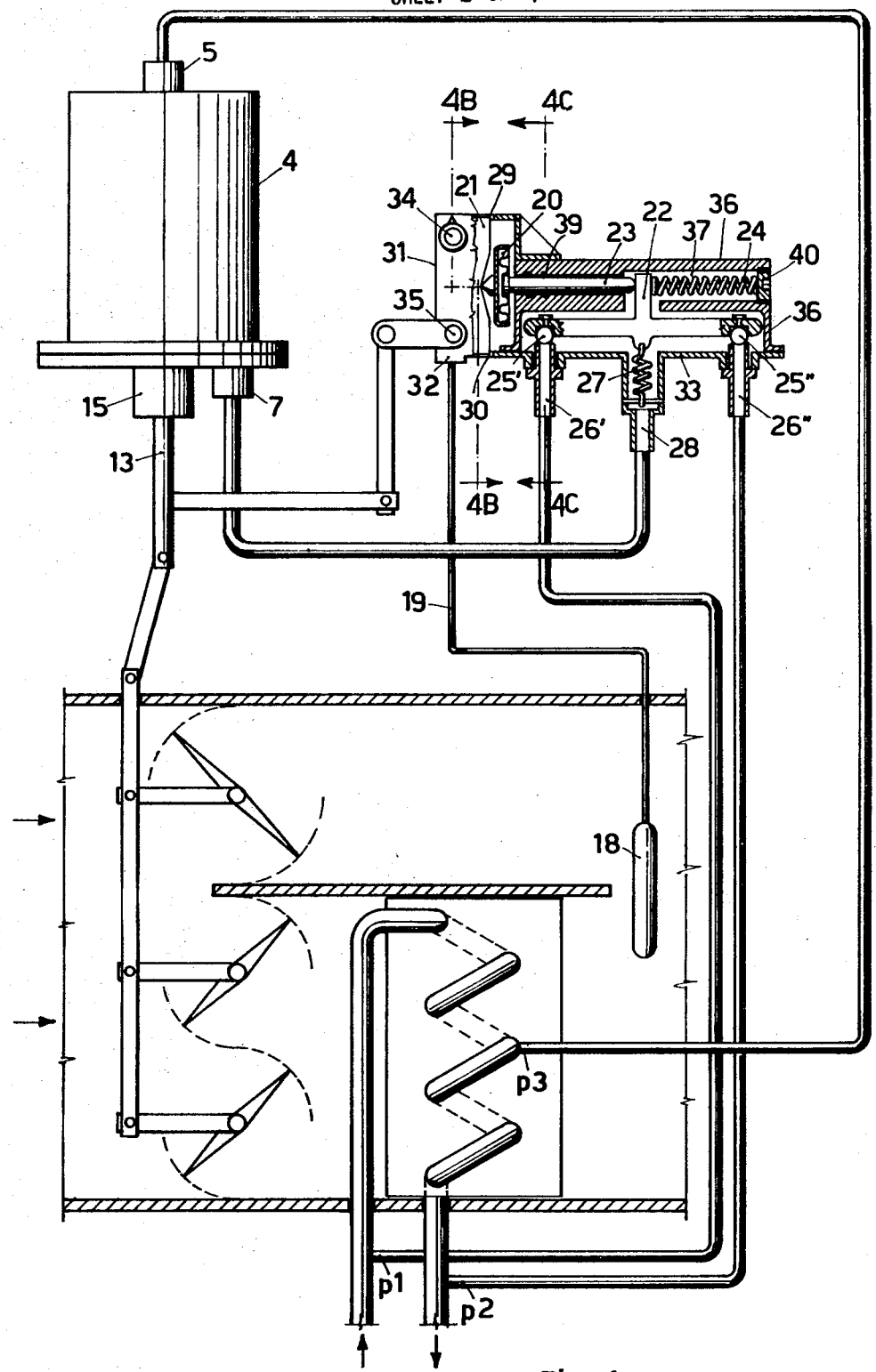

FIGS. 4a, 4b and 4c illustrate an embodiment of said controlling member which in this specific case consists of a thermostat.

Considering such Figures, there is shown a sensitive element 18 which by means of a capillary 19 is coupled to a bellows member 20 disposed on a rod 23 which engages a bracket 21 on one side and a cross-rocker 22 on the other side. Cross-rocker 22 is kept forced against rod 23 by counter spring 24. Cross-rocker 22 has at the ends of the two horizontal arms two shutting balls 25' and 25'' which are maintained close to the seats of the two ports 26' and 26'', being the whole system at balance, by the pull of a spring 27. Coaxially with spring 27 there is a port 28. Bracket 21 is longitudinally guided by means of two slits, an upper slit 29 and a lower slit 30, provided on the frame 31 and on the extension 32 of the cover 33. The bracket is opposed by two cam shafts 34 and 35, the first of which is located above the axis of rod 23 while the second is positioned below said axis. The cam shafts are disposed through circular apertures provided in frame 31, and are rotated therein eccentrically. Cam shaft 35 is coupled to piston shaft 13 of the hydraulic motor. Numeral 36 indicates the thermostat body, 37 is the housing hole of spring 24, and 38 indicates the passage hole of rod 23 which is sealed against the outer space by the rings 39. The screw plug 40 serves to insert spring 24 into hole 37 during the assembly. Body 36 is flanged to cover 33.

The system 18–19–20 is loaded with liquid and, with reference to FIGS. 1, 2, 3, port 28 is connected with chamber 17 while ports 26' and 26'' are connected with pressure areas $p_1$ and $p_2$ respectively; chamber 16 is connected with pressure area $p_3$.

Starting from the rest position with ports 26' and 26'' closed, if element 18 senses a temperature increase with respect to the value corresponding to said rest position, the liquid expansion pushes rod 23 to the right and overcoming the opposing action of springs 24 and 27 makes the cross-rocker rotate pivoting on ball 25'', thus freeing port 26' and putting it into communication with port 28. The cylinder chamber 17 is then subjected to pressure $p_1$ which being greater than pressure $p_3$ causes piston 10 to move upwardly. The opposite occurs when the cross-rocker turns about ball 25' in case that with respect to the rest position, the sensitive element 18 senses a temperature decrease with a consequent liquid contraction. It occurs in fact that spring 24, overcoming the action of spring 27, causes rod 23 to draw back, the rocker turns in the above-mentioned direction, port 26'' is put into communication with port 28, and cylinder chamber 17 is subjected to pressure $p_2$ which being smaller then pressure $p_3$ allows piston 10 to move downwardly.

The above-mentioned action brings, however, the piston to the two ends of its stroke without the possibility of stopping it in intermediate positions, and the regulation therefore would be an "on-off" control, that is a two-position control which would not be of the desired proportional type. In order to make the system be proportional it is necessary that to each variation of th physical quantity which is controlled (in this case the quantity is the temperature, but it might as well be a pressure, humidity etc.) corresponds a predetermined action of the control member, i.e. of the motor of FIG. 3, the shaft 13 of which may operate one or more valves and/or gates. To achieve the proportionality, the system is looped with a feedback effect, by mechanically connecting cam shaft 35 to shaft 13 in FIG. 3. In the accompanying drawings said connection is not illustrated, but it may be realized in a rigid or flexible way by means of rods and cranks, rancks, wires etc.

With the system thus completed, a given movement of piston rod 13 of the hydraulic motor causes cam shaft 35 to rotate by a predetermined amount, bringing rocker 22 back in its balance position. Assuming that the unbalance was caused by a temperature increase, the rotation of cam shaft 35 will be such to allow bracket 21 with pivot on cam shaft 34 to rotate clockwise displacing towards the left the point of support of bellows member 20 which withdraws pushed by rod 23 under the action of spring 24 until rocker 22 has closed again port 26' by means of shutting ball 25'. The opposite occurs when the unbalance is due to a temperature decrease.

Cam shaft 34 serves instead to manually vary the calibration point of the thermostatic assembly. Of course nothing is changed in the spirit of the invention if the function of the two cams is inverted.

The correct working of the whole thermostatic assembly requires a high filtering of the water circulating at the connection points of pressure $p_1$, $p_2$ and $p_3$ in order to prevent possible impurities from influencing the function of the ball valves and of the motor.

The circuit water should also be demineralized to avoid deposit formations in the regulation members.

It should be noted that the above discussed system is independent of the temperature of the water circulating in the circuit to be controlled, being responsive only to temperature variations in the fluid under control. The double action motor makes a return spring unnecessary, works independently of the absolute pressure in the circuit, but operates only as a function of the pressure difference between the upstream side and the downstream side of the member to be controlled.

The whole preceding description as well as the accompanying drawings relate to a thermostatic assembly, inasmuch as it has been assumed that the physical quantity to be controlled was the temperature. Of course, as previously stated, the working principle does not change if the physical quantity to be controlled is the pressure, because in this case it is sufficient to connect the bellows member 20 through a filter and a capillary with a pressure connection at the control point. Also in case that the quantity to be controlled is humidity or any other physical quantity there would not subsist any change in the basic principles for in such case it would be sufficient to use a suitable sensing element capable of transforming the sensed difference into a mechanical shifting. Many modifications and/or additions to the embodiments of the control member and device according to the present invention may be conceived by those skilled in the art, without exceeding the scope of the invention as defined by the appended claims.

What I claim is:

1. An apparatus for automatically controlling a physical quantity for the peripheral units of an air conditioning system having at least one water supplied heat exchanger, comprising:

means for sensing the physical quantity to be controlled;

actuating means, including a cylinder and a piston slidably disposed within said cylinder so as to define chambers above and below said piston, at least one of said chambers being coupled to the heat exchanger so that hydraulic pressure is exerted on said piston through said chamber, for actuating the heat exchanger; and control means, coupled to said sensing means and to said actuating means, including at least three hydraulic pressure tap-offs coupled to the heat exchanger and to the other chamber of said actuator means, for selectively admitting hydraulic pressure from the heat exchanger to said cylinder in response to the difference of th physical quantity controlled with respect to the value of said physical quantity taken as the reference value, for controlling the movement of said piston in said cylinder and thereby controlling the physical quantity regulated by the air conditioning system.

2. The apparatus as recited in claim 1, wherein said control means comprises a housing having at least three hydraulic ports coupled together by a common conduit, a rocker arm pivotably secured in said conduit for controlling the hydraulic pressure admitted to said control means by said ports, a bellows coupled to said sensing means and mounted on a shaft slidably disposed in said housing, a positioning bracket slidably disposed in said housing adjacent one end of said shaft, and first spring means disposed in said housing for biasing said rocker arm against the other end of said shaft so that said shaft engages said positioning bracket.

3. The apparatus as recited in claim 2, wherein said rocker arm further comprises at least two ball valves, disposed in the ends thereof opposite at least two of said hydraulic ports, for engaging said ports and controlling the admittance of hydraulic pressure to said control member, said third port being coupled to the other chamber of said cylinder and admitting at least two different hydraulic pressures to said cylinder from the heat exchanger, and second spring means, for biasing said rocker arm and said ball valves downwardly so that said valves engage said ports, and securing said rocker arm so that it pivots at either end on said ball valves.

4. The apparatus as recited in claim 3, wherein said control means further comprises at least two rotatable cam shafts, eccntrically rotatable in said housing adjacent said positioning bracket, at least one of said cam shafts being coupled to said piston for adjusting the position of said positioning bracket and said rocker arm and thereby proportionately controlling the physical quantity regulated, the other of said cam shafts being manually rotatable for adjusting the position of said positioning bracket in said control means and thereby regulating the reference value of the physical quantity controlled.

5. The apparatus as recited in claim 3, wherein said ports engaged by said ball valves are coupled to the inlet and outlet of the heat exchanger, and wherein said third port coupled to one of said two chambers in said cylinder is coupled to said heat exchanger at a point having a pressure value in between the pressure at the inlet and outlet of the heat exchanger, by said chamber, the pressure at the outlet and inlet of the heat exchanger being admitted selectively to said other chamber of said cylinder by said ball valves in response to variations in the physical quantity controlled with respect to the reference value thereof.

6. The apparatus as recited in claim 4, wherein said housing further comprises at least two circular apertures through which said cam shafts are disposed, said shafts being rotatable eccentrically in said apertures adjacent said positioning bracket.

* * * * *